UNITED STATES PATENT OFFICE.

DAVID H. WILSON, OF PATERSON, NEW JERSEY, AND SANSOM M. RODGERS, OF PITTSBURGH, PENNSYLVANIA; SAID RODGERS ASSIGNOR TO SAID WILSON.

ALLOY FOR ARC-WELDING.

1,187,412.  Specification of Letters Patent.  Patented June 13, 1916.

No Drawing.  Application filed June 16, 1915, Serial No. 34,403.  Renewed May 10, 1916.  Serial No. 96,539.

*To all whom it may concern:*

Be it known that we, DAVID H. WILSON and SANSOM M. RODGERS, citizens of the United States, and residents, respectively, of Paterson, county of Bergen, State of New Jersey, and Pittsburgh, in the county of Allegheny and State of Pennsylvania, have invented a certain new and useful Alloy for Arc-Welding, of which the following is a specification.

The object of our invention is an alloy for an electric welding electrode consisting of a base metal and a strength giving ingredient having such a relation to the arc employed as to result in a retention of a substantial amount of the ingredient in the welded joint after being transferred thereto across the arc.

In electric welding, it has been found that steels employed as electrodes from which metal is transferred to the work, are so affected by the current that the final weld lacks the desirable quality of ductility, strength and toughness.

One of the objects of our invention is an alloy that overcomes these difficulties and provides a weld that retains the ductility, strength and toughness required for successfully joining, repairing or otherwise treating boiler plate or other pieces of work so that the weld has characteristics making it substantially as tough and ductile as the rest of the work.

Our alloy consists preferably of steel or iron containing a comparatively large percentage of manganese; that is such an amount that after passing across a given arc, enough is left in the weld to give the degree of toughness and ductility described.

Manganese in some quantities is common in steel and has been used in welding heretofore. But we believe that we are the discoverers that an excess of manganese in the electrode over that burned up in the arc has the effect of preserving strength characteristics that are otherwise lost.

Our invention relates also to methods of using the aforesaid alloy.

Heretofore alloys and electrodes have been used for welding containing manganese in small proportions in connection with a hot burning arc that burned the manganese out and so burned the iron as to weaken it.

When welding metal is transferred across an arc, the arc exerts a destructive effect. Any carbon present is almost entirely consumed. If manganese is present it is similarly affected. The base metal itself, be it iron or any other welding metal adapted to make a weld in repairing or joining a metal or metals, is injuriously affected.

If enough manganese is present in the alloy, with carbon, the manganese diminishes the extent of the oxidation of the carbon. Heretofore when steel alloys have been used for arc welding containing these ingredients, their small amount, and the use of them caused their elimination in the arc. The negligible quantities of the ingredients as well as the hot arc, were responsible for this result. By increasing the quantities of the ingredients the welding metal is protected from burning and the welded joint retains the characteristics of ductility and toughness that are otherwise lost.

Carbon appears to be more rapidly eliminated than manganese, and the use of manganese provides a weld that is tougher than possible with carbon alone. Manganese is more effective than carbon in protecting the welding metal from burning in the arc. Manganese has been used in fluxes but fluxes injure rather than improve welds. Any ingredient that has one or more of these beneficial manganese characteristics is an equivalent for manganese.

Any welding metal adapted to make a welding joint between parts of any one or more metals, homogeneously combined with one or more ingredients having the effect of manganese on an iron weld, lies within the scope of our invention.

Our alloy may for example be composed of iron combined with some 1.00% manganese and if desired .18% carbon. These percentages are by no means absolute but are merely an illustration of the embodiment of our invention. The manganese may for an arc having a temperature such as will transfer the alloy in a plastic condition be as low as .50% and from there it may run up to 1.50% or more without losing the advantages of the use of manganese in the afore-mentioned alloy. And the carbon may if desired, be varied correspondingly.

Heretofore alloys have been proposed having considerable manganese, but in all cases the amount has not been substantially in excess of the amount lost in the arc.

We do not intend to limit our invention to the specific proportions above-mentioned nor do we set any specific limits to the field of our invention, for these limits may be varied with the different characteristics required in the weld for different classes of work and the current employed and other factors, the essence of our invention lying in the employment of such substantial proportions of the element with an arc of a given temperature that substantial results are attained. It lies well within the field of our invention to vary the carbon and the manganese or vary their proportions to each other without departing from the substance of our invention, provided they bear the necessary relation to the arc temperature employed.

While defining manganese as an element of our alloy, we do not limit our invention to that metal for any other metal which is the substantial equivalent of manganese for the purpose stated may be substituted.

The burning quality of the arc, and the various imperfections in the weld do not destroy the usefulness of the weld, since in spite of such defects, it is useful for purposes where full strength qualities are not essential.

Our invention aims to extend the range of usefulness of arc welding.

What we claim is:—

1. An alloy for electric welding with an arc which is composed of iron homogeneously combined with manganese in such substantial proportions as will retain in the welded joint a substantial degree of strength and ductility.

2. An alloy for electric arc welding of iron homogeneously combined with manganese in such substantial proportions as to provide the degree of tensile strength and ductility in steel having boiler plate characteristics, and an additional amount to compensate for that lost in the transfer across the arc.

3. An electrode for electric welding composed of a homogeneous alloy of iron, and manganese in excess of .50%.

4. A metal electrode for arc welding of metals consisting of a homogeneous alloy containing a welding metal and an ingredient having manganese characteristics to prevent the burning of said welding metal in the arc.

5. An electrode for arc welding of metals consisting of a homogeneous alloy of a suitable welding metal therefor, and an ingredient having manganese characteristics of preventing burning of said welding metal and provided a toughness in the weld in excess of that which is natural to said welding metal without said ingredient.

6. The method of electric welding which consists of transferring across an arc from an electrode, welding material containing an ingredient having a characteristic of manganese to prevent burning substantially in excess of the amount lost in the arc.

7. The method of electric welding which consists of transferring across an arc, in a plastic state, from an electrode, welding metal containing an ingredient having a relation to the welding metal similar to that which manganese bears with respect to iron to prevent burning substantially in excess of the amount lost in the arc.

8. The method of electric welding which consists of the transfer across an arc of a welding metal from an electrode having an ingredient possessing a relation to the welding metal similar to that which manganese bears with respect to iron, of such proportions as adds substantially to the toughness of the weld.

9. An electrode for electric arc welding composed of a homogeneous alloy of iron, and of manganese in excess of .50% and .18% carbon.

10. An electrode for electric arc welding composed of a homogeneous alloy combined with such an excess of manganese as will be transferred across the welding arc and be left in the welded joint to add substantially to its toughness.

11. An electrode for electric arc welding which consists of iron combined with an amount of manganese substantially in excess of the amount lost during the transfer across said arc.

12. An electrode for electric arc welding with an arc temperature near the critical point for said alloy composed of an alloy of iron and of manganese from .5% up in effective proportions and above .18% carbon or thereabout.

13. An electrode for electric arc welding composed of iron combined with such excess of manganese as will be transferred across the welding arc and be left in the welded joint to add substantially to its toughness.

14. An electrode for electric arc welding with an arc temperature near the lowest degree possible for successful welding, which consists of iron combined with an amount of manganese substantially in excess of the amount lost during the transfer across said arc.

Signed at New York, in the county of New York and State of New York, this 11 day of June, A. D. 1915.

DAVID H. WILSON.
SANSOM M. RODGERS.

Witnesses:
MYRON F. HILL,
A. L. TRAVIS.